United States Patent
Jiang et al.

(10) Patent No.: US 12,364,262 B2
(45) Date of Patent: *Jul. 22, 2025

(54) WATER BASED SEMI-SYNTHETIC METAL WORKING FLUID COMPOSITION CONTAINING AN AMINOPROPENEDIOL

(71) Applicant: Dow Global Technologies LLC, Midland, MI (US)

(72) Inventors: Qi Jiang, Shanghai (CN); Xue Chen, Manvel, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/723,773

(22) PCT Filed: Mar. 31, 2022

(86) PCT No.: PCT/CN2022/084429
§ 371 (c)(1),
(2) Date: Jun. 24, 2024

(87) PCT Pub. No.: WO2023/184348
PCT Pub. Date: Oct. 5, 2023

(65) Prior Publication Data
US 2025/0040540 A1    Feb. 6, 2025

(51) Int. Cl.
| | | |
|---|---|---|
| *A01N 33/08* | (2006.01) | |
| *A01P 1/00* | (2006.01) | |
| *C10M 133/08* | (2006.01) | |
| *C10M 159/00* | (2006.01) | |
| *C10N 30/16* | (2006.01) | |

(52) U.S. Cl.
CPC ............. *A01N 33/08* (2013.01); *A01P 1/00* (2021.08); *C10M 133/08* (2013.01); *C10M 159/00* (2013.01); *C10N 2030/16* (2013.01)

(58) Field of Classification Search
CPC ............ C10N 2030/16; C10M 133/08; C10M 159/00; A01P 1/00; A01N 33/08
See application file for complete search history.

(56) References Cited

U.S. PATENT DOCUMENTS

| | | | |
|---|---|---|---|
| 4,143,119 A | 3/1979 | Asperger et al. | |
| 5,399,274 A | 3/1995 | Marcus | |
| 2012/0088706 A1* | 4/2012 | Kupfer | C23F 11/10 |
| | | | 508/297 |
| 2017/0107440 A1* | 4/2017 | Cuff | B05D 1/30 |

FOREIGN PATENT DOCUMENTS

| | | |
|---|---|---|
| CN | 102757848 | 10/2012 |
| CN | 104342274 | 2/2015 |
| EP | 0497210 | 8/1992 |
| EP | 0839802 | 5/1998 |
| WO | 2005055720 | 6/2005 |

OTHER PUBLICATIONS

Bennett, "Antimicrobial Properties of Butanolamines and Propanolamines in Metal Working Fluids", The Journal of General and Applied Microbiology, 1979, vol. 25, pp. 63-69.
Breuer, "Alkanolamine in wassermischbaren Kuhlschmierstoffen", Gefahrstoffe, 2004, vol. 64, No. 11/12, pp. 473-479.
Metalworking Fluid Additives, Angus, 2003, pp. 1-8.
Sandin, "Selective Toxicity of Alkanolamines", American Society for Microbiology, 1990, vol. 34, No. 3, pp. 491-493.

* cited by examiner

*Primary Examiner* — Vishal V Vasisth

(57) ABSTRACT

The present invention describes a water-based metal working fluid comprising a base oil, an organic acid, optionally emulsifiers, a concentrate additive, water and a microbial growth control agent which comprises an aminopropanediol.

13 Claims, No Drawings

WATER BASED SEMI-SYNTHETIC METAL WORKING FLUID COMPOSITION CONTAINING AN AMINOPROPENEDIOL

This application is a 371 of PCT/CN22/84429, filed Mar. 31, 2022.

The current invention relates to a novel class of aminopropanediols. Embodiments relate to a method of controlling microbial growth in metal working fluids, comprising adding such an aminopropanediol to the metal working fluid. Other embodiments relate to semi-synthetic metal working fluid compositions which include the microbial growth control agent comprising this particular class of aminopropanediols.

INTRODUCTION

Amines are widely used in a variety of applications due to their properties of anti-corrosion, neutralization, and pH adjustment. One popular application for amines is in metalworking fluids. Metalworking fluids ("MWFs") are formulations with the properties of lubricity, coolant and corrosion resistance, which are used in the metal manufacturing process such as cutting, grinding, boring, turning and drilling. Existing MWFs are typically classified as neat oil, soluble oil, semi-synthetic fluid, or synthetic fluid, with each category exhibiting different functions of cooling, lubricating, anti-rust and cleaning. A commercial MWF may comprise oils, detergents, surfactants, lubricants, anti-corrosion agents, water and other ingredients. The amine composition is usually used to maintain alkaline pH and neutralize acid functional components in the MWFs. Organic amines in MWFs, and in particular the synthetic and semi-synthetic fluids, are usually degraded over time due to the microbial growth which negatively impacts fluid performance because microbes feed on the active ingredients in the fluid. The MWF industry therefore, calls for amine components which can hold pH value of the formulation and maintain performance over a long time period.

Such microbial growth in the MWFs may cause serious problems in metalworking processing in many forms including: MWFs general souring, MWFs viscosity changing, MWFs shelf life shortening, and the corroding of tools and materials. Additionally, the functioning of equipment and processes such as feeding nozzles, storage tanks, pipelines and recycling system facilities may also be impacted by microbe growth in MWFs. This souring increases the cost of MWFs, accelerates corrosion rates and decreases efficiency of metal processing. Thus, there is an unfulfilled need in the MWF industry for components which do not support microbial growth and maintain performance over a long time.

The most common solution is to add biocides and amine alcohols either continuously or as a batch treatment to a given MWF. However, biocides and some secondary amine alcohols are limited by regulatory restrictions. For biocide-containing MWF, most of the biocide chemicals will release formaldehyde over time which is hazardous to human health.

It is therefore desired to have new semi-synthetic metal working formulations with new biocidal compositions which provide improved cooling, lubricity, concentrate stability, and long shelf life, without the environmental health and safety concerns of present fluids.

This invention addresses at least some of the above-described needs.

SUMMARY

The present invention relates to a novel class of aminopropanediols. The present invention also relates to a method of controlling microbial growth in metal working fluids, wherein the method includes the addition of at least one such aminopropanediol to the metal working fluid. The present invention also describes a water based semi-synthetic metal working fluid comprising a base oil, an organic acid, emulsifiers, a concentrate additive, water and a microbial growth control agent which comprises the novel aminopropanediol.

DETAILED DESCRIPTION

Depending on their composition, metal working fluids are classified as neat oil, soluble oil, semi-synthetic fluid, or synthetic fluid. Soluble oil MWFs comprise 50-70 wt. % oil with the rest being anti-wear/extreme pressure additives and emulsifiers. Semi-synthetic MWFs contain a significant amount of water, typically up to 50-60 wt. %. Semi-synthetic fluids have balanced lubricity and cooling performance and are thus attractive for use as MWFs.

The present invention relates to synthetic and/or semi-synthetic metal working fluids, and new materials which can be used as antimicrobials for use in such fluids. The novel antimicrobials of the present invention are aminopropanediols corresponding to the following formula (I):

formula (I)

wherein $R_1$ is propane-2,3-diol; $R_2$ is hydrogen, methyl, ethyl, 2-hydroxyethyl, or propane-2,3-diol; and $R_3$ is hydrogen, methyl, ethyl, 2-hydroxyethyl or propane-2,3-diol.

Such aminopropanediol materials can be produced by the simple reaction between glycidol epoxide or 3-chloro-1,2-propanediol with ammonia, methylamine or dimethylamine, which types of reaction are generally known in the art. Useful aminopropanediol compounds include but are not limited to 3-aminopropane-1,2-diol, 3-(2-(hydroxyethyl)methylamino)propane-1,2-diol, 3-(methylamino)bis(propane-1,2-diol), 3-(amino)bis(propane-1,2-diol), 3-(amino)tris(propane-1,2-diol), 3-(methylamino)propane-1,2-diol and mixtures thereof.

The MWFs of the present invention comprise water, one or more base oils, one or more organic acids, one or more emulsifiers, one or more lubricants, one or more amines, where amines function as pH adjusters and/or microbial growth control agents, where at least one amine comprises an aminopropanediol of formula (I).

The microbial growth control agent may further comprise one or more additional antimicrobial materials such as glycol ether amines which may be used in combination with the above disclosed materials to achieve a certain microbial growth control targets. The concentration of the microbial growth control agent/pH adjuster in the MWF (including the aminopropanediols of formula (I)) may range from 1, 4, 6, 8, or 10 percent by weight of the formulation up to 30, 25, 15, or 12 percent of the formulation. Preferably the aminoprpanediols of formula (I) comprise from 2, preferably 3, or even 5 percent up to 25, preferably 20 or even 15 percent by weight of the MWF.

The MWFs of the present invention also include a base oil. The base oil can be any base oil generally known in the art for use in MWFs. Preferably the base oil is a base oil selected from tall oils, naphthenic oils, paraffinic oils or ester oils, or combinations thereof. The concentration of the base oil(s) in the MWF may range from 5, 7, 10, or 15 percent by weight of the formulation up to 50, 45, 40, or 35 percent of the formulation.

The water used in the present formulations is preferably deionized water, and may comprise from at least 20, preferably 25, 30, or even 35 percent by weight of the formulation up to a maximum of 70, 65, 60, 55 or even 50 percent by weight of the formulation. It is contemplated that these formulations may be further diluted with additional water prior to use, altering these ranges accordingly. For example, prior to use, the formulations may be diluted such that the base oil concentration is from 1 to 20 percent by weight of the diluted formulation, more typically 5 to 7 percent by weight.

The MWFs of the present invention also include one or more organic acids as solubilizers and/or corrosion inhibitors. Preferred organic acids include 2-ethylhexoic acid, azelaic acid, toll oil fatty acid, 12-hydoxyl-(cis)-9-octadecenoic acid, dicarboxylic acid, and 9-octadecenoic acid. The concentration of the organic acid in the MWF may range from 2, 3, 4, or 5 percent by weight of the formulation up to 12, 10, 8, or 7 percent of the formulation.

The MWFs of the present invention may optionally also include one or more emulsifiers. The emulsifier may be anionic, cationic or nonionic. Examples of suitable anionic surfactants or emulsifiers are alkali metal, ammonium and amine soaps; the fatty acid part of such soaps contains preferably at least 10 carbon atoms. The soaps can also be formed "in situ;" in other words, a fatty acid can be added to the oil phase and an alkaline material to the aqueous phase.

Other examples of suitable anionic surfactants or emulsifiers are alkali metal salts of alkyl-aryl sulfonic acids, sodium dialkyl sulfosuccinate, sulfated or sulfonated oils, e.g., sulfated castor oil; sulfonated tallow, and alkali salts of short chain petroleum sulfonic acids.

Suitable cationic surfactants or emulsifiers are salts of long chain primary, secondary or tertiary amines, such as oleylamide acetate, acetylamine acetate, di-dodecylamine lactate, the acetate of aminoethyl-aminoethyl stearamide, dilauroyl triethylene tetramine diacetate, 1-aminoethyl-2-heptadecenyl imidazoline acetate; and quaternary salts, such as cetylpyridinium bromide, hexadecyl ethyl morpholinium chloride, and diethyl di-dodecyl ammonium chloride.

Examples of suitable nonionic surfactants or emulsifiers are condensation products of higher fatty alcohols with ethylene oxide, such as the reaction product of oleyl alcohol with 10 ethylene oxide units; condensation products of alkylphenols with ethylene oxide, such as the reaction product of isoctylphenol with 12 ethylene oxide units; condensation products of higher fatty acid amides with 5, or more, ethylene oxide units; polyethylene glycol esters of long chain fatty acids, such as tetraethylene glycol monopalmitate, hexaethyleneglycol monolaurate, nonaethyleneglycol monostearate, nonaethyleneglycol dioleate, tridecaethyleneglycol monoarachidate, tricosaethyleneglycol monobehenate, tricosaethyleneglycol dibehenate, polyhydric alcohol partial higher fatty acid esters such as sorbitan tristearate, ethylene oxide condensation products of polyhydric alcohol partial higher fatty acid esters, and their inner anhydrides (mannitol-anhydride, called Mannitan, and sorbitol-anhydride, called Sorbitan), such as glycerol monopalmitate reacted with 10 molecules of ethylene oxide, pentaerythritol monooleate reacted with 12 molecules of ethylene oxide, sorbitan monostearate reacted with 10-15 molecules of ethylene oxide, mannitan monopalmitate reacted with 10-15 molecules of ethylene oxide; long chain polyglycols in which one hydroxyl group is esterified with a higher fatty acid and other hydroxyl group is etherified with a low molecular alcohol, such as methoxypolyethylene glycol 550 monostearate (550 meaning the average molecular weight of the polyglycol ether). A combination of two or more of these surfactants may be used; e.g., a cationic may be blended with a nonionic or an anionic with a nonionic.

Particularly suitable emulsifiers include C16-18 alcohols which have been ethoxylated or propoxylated; ethoxylated C12-C15 alcohols; sodium alkane sulfonate and alky ether carboxylates.

The concentration of the emulsifier(s) in the MWF may range from 4, 5, 6, 8, or 10 percent by weight of the formulation up to 25, 20, 15, or 12 percent of the formulation.

The MWFs of the present invention may also include one or more concentrate additives. If present, preferred concentrate additives include diethylene glycol butyl ether, ethylene glycol monobutyl ether, and propylene glycol butyl ether. If present, the concentration of the concentrate additive(s) in the MWF may range from 0.3, 0.5, 1.0, or 1.5 percent by weight of the formulation up to 2.5, 2.0, or 1.8 percent of the formulation.

The MWFs of the present invention may also include other additives to provide additional functionality as generally known in the art.

The microbial growth controlled by the presently disclosed biocide typically consists of contaminations which are a bacterial and fungal mixture. Some typical fungi and bacterial 5 containments include but are not limited to *Aeromonas hydrophila* (ATCC 13444), *Candida albicans* (ATCC 752), *Desulfovibrio desulfuricans* (ATCC 7757), *Escherichia coli* (ATCC 8739), *Flavobacterium ferrugineum* (ATCC 13524), *Fusarium oxysporum* (ATCC 7601), *Klebsiella pneumoniae* (ATCC 13883), *Proteus mirabilis* (ATCC 4675), *Pseudomonas aeruginosa* (ATCC 8689), *Pseudomonas oleovorans* (ATCC 8062) and *Saccharomyces cerevisiae* 10 (ATTC 2338). The strains listed above can vary around the world and the present innovation is fully envisioned as broad-spectrum microbial growth control agent and/or biocide which can be used against any common MWF microbial contaminates.

EXAMPLES

Experiments to test the efficacy of formulations including the presently disclosed microbial growth control agent can be conducted as follows. Table 1 contains a description of the materials used in these examples.

TABLE 1

Diluted Metalworking Fluid Ingredients

| Material | Type | Source |
| --- | --- | --- |
| Mineral oil | Oily agent | SCRC |
| EcoSurf SA-7 | Emulsifer | Dow |
| Dowfax 20A42 | Emulsifer | Dow |
| Secondary alkane sulphonate | Anionic surfactant | SCRC |
| Tall oil acid | Corrosion agent | SCRC |
| Diacid | Corrosion agent | SCRC |
| Methylaminopropanediol | pH adjustor | Dow |
| Dimethylaminopropanediol | pH adjustor | Dow |
| Monoisopropanolamine | pH adjustor | Dow |
| Processing Water | Water containing common bacterial agents found in metal working processes | N/A |
| Aluminum strip (#ADC12) | Metal | TCI |

A series of formulations is prepared according to Table 2, with the different amines listed in Table 3.

TABLE 2

| Material | Concentrated Formulation |
|---|---|
| Mineral oil | 12.5 wt. % |
| EcoSurf SA-7 | 7.5 wt. % |
| Dowfax 20A42 | 5.5 wt. % |
| Secondary alkane sulphonate | 4.5 wt. % |
| Tall oil acid | 4.5 wt. % |
| Sebacic acid | 4.5 wt. % |
| Amine (as indicated in Table 3) | 10.7 wt. % |
| Processing Water | 50.3 wt. % |

TABLE 3

| Item | Amine type | Diluted water type |
|---|---|---|
| Example 1 (IE1) | Methylaminopropanediol | Processing water |
| Example 2 (IE2) | Dimethylaminopropanediol | Processing water |
| Comparative Example 1 (CE1) | Monoisopropanolamine | Processing water |

The concentrated formulations are prepared as follows. The indicated amount of dionized water is poured into a container. Add mineral oil, EcoSurf SA-7, Dowfax 20A42, secondary alkane sulfonate, tall oil acid and diacid (sebacic acid) into the water. Stir the formulation by magnetic stirrer at 200 rpm at 60° C. for 1 hour. Add the indicated amine as pH adjustor.

The concentrated formulations are then diluted by processing water by a factor of 20 times, based on the quantity of the whole concentrated formulation. Test pH value by pH titrator (Mettler Toledo: #SevenMulti). If pH value of the diluted formulation is below 9.5, introduce additional monoethanolamine (1-2 droplets) to increase pH value to at least 9.5.

pH aging test: test pH value by pH titrator (Mettler Toledo: #SevenMulti) of prepared diluted formulations for 0-day and 14-day. Samples are placed in ambient temperature.

TABLE 4

| | pH aging test: | | | |
|---|---|---|---|---|
| Sample # | Initial pH value | 1-week aging pH value | 2-week aging pH value | pH loss (%) |
| IE1 | 9.69 | 9.53 | 9.53 | −1.7% |
| IE2 | 9.50 | 9.35 | 9.28 | −2.3% |
| CE1 | 9.55 | 8.72 | 8.52 | −10.8% |

The pH decrement after 2-week aging should be as small as possible. IE1 with methylaminopropanediol and IE 2 with dimethylaminopropanediol show limited pH loss (<3%). CE1 with monoisopropanolamine is not as good in that pH loss exceeds 10%.

The invention claimed is:

1. A metal working fluid, comprising:
    a. at least one base oil;
    b. at least one microbial growth control agent comprising an aminopropanediol with a structure that corresponds to the formula:

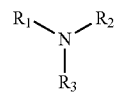

wherein $R_1$ is propane-2,3-diol; $R_2$ is hydrogen or methyl; and $R_3$ is hydrogen or methyl;
    c. one or more organic acids;
    d. optionally, one or more emulsifiers;
    e. one or more concentrate additives; and
    f. water;
wherein at least one of $R_2$ and $R_3$ is methyl.

2. The metal working fluid of claim 1, wherein both of R2 and R3 of the microbial growth control agent are methyl.

3. The metal working fluid of claim 1, wherein the microbial growth control agent further comprises another amine.

4. The metal working fluid of claim 1, wherein the base oil is selected from naphthenic oils, paraffinic oils, ester oils and mixtures thereof.

5. The metal working fluid of claim 1, wherein the emulsifier is selected from C16-18 alcohols which have been ethoxylated or propoxylated, ethoxylated C12-C15 alcohols, sodium alkane sulfonate and alky ether carboxylates and mixtures thereof.

6. The metal working fluid of claim 1, wherein the organic acid is selected from ethylhexoic acid, azelaic acid, tall oil fatty acid, 12-hydoxyl-(cis)-9-octadecenoic acid, dicarboxylic acid, 9-octadecenoic acid, sebacic acid, and mixtures thereof.

7. The metal working fluid of claim 1, wherein the concentrate additive is selected from diethylene glycol butyl ether, ethylene glycol monobutyl ether, propylene glycol butyl ether and mixtures thereof.

8. The metal working fluid of claim 1, wherein the microbial growth control agent is present in an amount of from 6 to 15 percent by weight of the metal working fluid.

9. The metal working fluid of claim 1, wherein the base oil is present in an amount of from 10 to 45 percent by weight of the metal working fluid.

10. The metal working fluid of claim 1, wherein the emulsifier is present in an amount of from 5 to 20 percent by weight of the metal working fluid.

11. The metal working fluid of claim 1, wherein the organic acid is present in an amount of from 3 to 10 percent by weight of the metal working fluid.

12. The metal working fluid of claim 1, wherein the water is present in an amount of from 20 to 60 percent by weight of the metal working fluid.

13. The metal working fluid of claim 1 wherein the aminopropanediol is methylaminopropanediol or dimethylaminopropanediol.

* * * * *